June 24, 1969     E. L. CARPENTER     3,451,711

PIPE HANDLING APPARATUS

Filed Aug. 24, 1967     Sheet 1 of 2

INVENTOR.
EDGAR L. CARPENTER
BY
Gardner + Zimmerman
ATTORNEYS

INVENTOR.
EDGAR L. CARPENTER
BY
ATTORNEYS

United States Patent Office 3,451,711
Patented June 24, 1969

3,451,711
PIPE HANDLING APPARATUS
Edgar L. Carpenter, 330 Empire Ave.,
Modesto, Calif. 95351
Filed Aug. 24, 1967, Ser. No. 662,966
Int. Cl. B66c 1/10
U.S. Cl. 294—113                                    5 Claims

ABSTRACT OF THE DISCLOSURE

This disclosure describes a set of pipe tongs for lifting and handling heavy sections of pipe, for example, installing the pipe in a narrow open trench or ditch. The tongs include means for automatically releasing the pipe after it is placed in the trench to facilitate withdrawal of the tongs.

Background of the invention

The present invention relates to devices for handling heavy sections of pipe that are too large to be handled manually. More particularly, the present invention relates to a lifting device for lifting a large section of pipe and then moving it to a desired position and placing it in position.

In handling large sections of pipe it is necessary that they be moved from a storage area and loaded on a truck or other transport vehicle. The pipe sections must then be unloaded and placed in a new storage area and, finally, the pipe sections installed in a trench or open ditch. In the past, pipe sections have generally been lifted by various sling arrangements that are passed around the pipe and connected to the hoisting mechanism, as for example, the hook on a crane or similar device. When slings are used, it is, of course, necessary that the pipe be elevated to place the slings about the pipe section and connect them to the lifting hook. After the pipe is moved to its new position, the slings must be manually removed. Thus, considerable manual effort is required in loading and unloading pipe or placing pipe in a trench or ditch.

In addition to the manual labor required, it is oftentimes difficult, if not impossible, to remove the slings when the pipe is placed in a narrow ditch. Further, steps must be taken to elevate the pipe from the bottom of the ditch in order that the slings can be removed from the pipe. The elevating of the pipe from the bottom of the ditch creates a problem in filling under the pipe in order that the pipe will have sufficient support when the ditch is filled.

In order to overcome the above problems, various lifting devices have been designed to permit the lifting of pipe and placing it in a trench or ditch. However, most of these various lifting devices have not been entirely satisfactory in that they require manual manipulation to release them from the pipe after it is placed in the ditch. This again creates the problem of an operator being required to enter the trench to release the pipe, and the trench must be made sufficiently wide to permit the operator to enter the trench. This increase in trench width increases the expense of digging the trench and thus the overall expense of laying the pipe.

Summary of the invention

The pipe handling apparatus of the invention overcomes the above difficulties by providing a device which automatically releases a pipe after it is set in place. Moreover, the apparatus is initially secured to the pipe in a simple manner. More particularly, the device includes a pair of tong members that move inwardly to engage the pipe as the lifting device is raised. After the tongs engage the pipe, further raising of the device will cause it to lift the pipe to permit it to be moved to the desired location. In order to release the pipe, it is only necessary to lower the pipe in contact with a solid surface and then lower the lifting device which causes the tongs to move outwardly and release the pipe. The lifting device is provided with an automatic latching mechanism that latches the tongs in an open position to permit removal of the lifting device from the pipe section. The automatic opening of the tongs and releasing of the pipe permits the pipe to be installed in very narrow trenches with the pipe resting directly on the bottom of the trench. Further, since the opening of the tongs and the releasing of the pipe is automatic, its operation does not require that an operator enter the trench to release the device.

After the device is latched in an open position, it can be moved to a position to pick up the next section of pipe and lowered around the next section of pipe. An operator then simply releases the latch means to permit the tong members to close about the section of pipe in order that it may be lifted.

Brief description of the drawings

The present invention will be more easily understood from the following detailed description of a preferred embodiment when taken in conjunction with the attached drawings in which.

Description of a preferred embodiment

Figure 1:
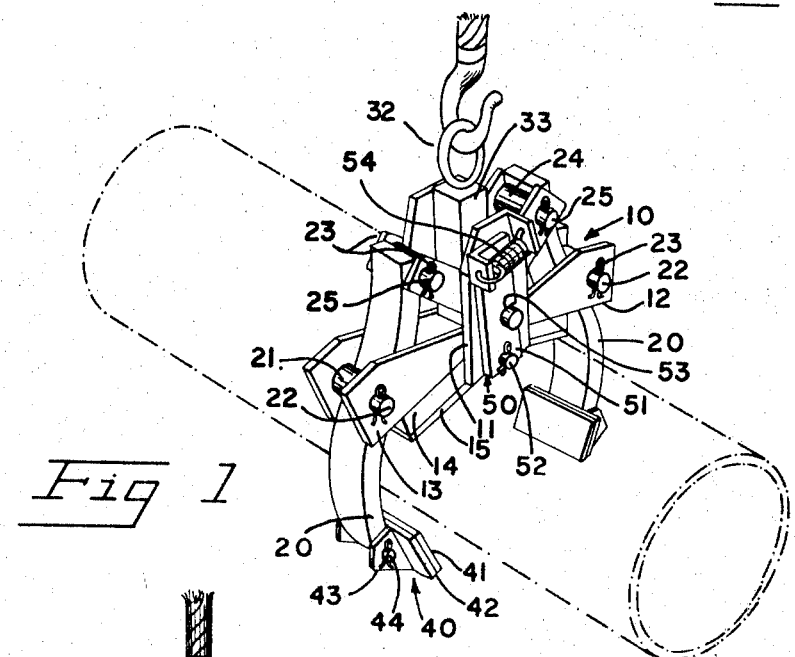
FIGURE 1 is a perspective view of the lifting device constructed in accordance with this invention, showing the device in an open position and positioned about a section of pipe.
Figure 2:
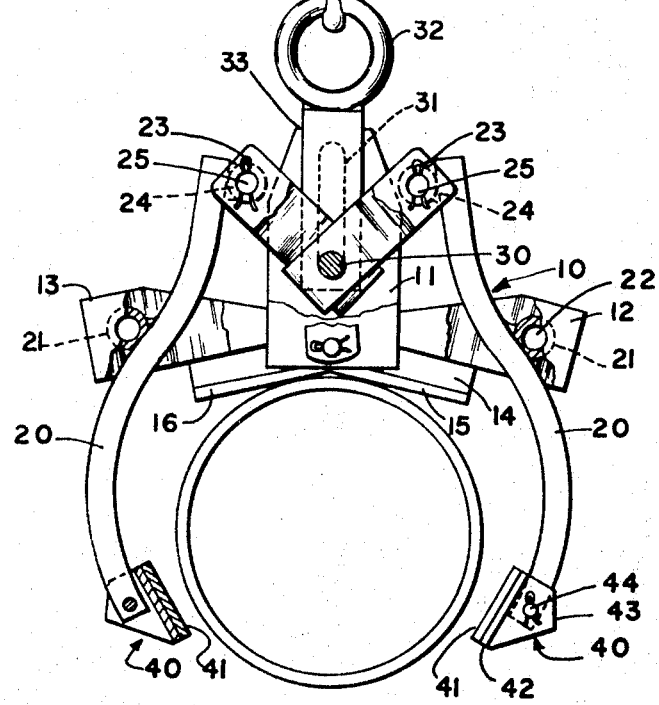
FIGURE 2 is an elevation view of the lifting device shown in FIGURE 1 with portions of the device being shown in section.

Referring now to FIGURES 1 and 2 there is shown a lifting device constructed according to this invention positioned around a section of pipe. The lifting device constructed according to this invention utilizes a main frame member 10 having two laterally spaced, vertically extending portions 11. A pair of arm members 12 and 13 extend substantially horizontally from the bottom of each of the vertical portions of the main frame. The vertical portion of the main frame may be secured to the horizontally extending arms by means of welding or the like. The pairs of horizontal arms of the main frame are retained in a spaced-apart position by means of two pad members 15 and 16. The pad members 15 and 16 have a generally channel shape with the legs 14 of the channels being secured to the arms by means of welding or the like.

The lifting device utilizes a pair of tong members 20 whose lower portion has a general arcuate shape to permit the tongs to extend about a circular pipe section. Each of the tong members is provided on its outer surface with a tubular journal 21 at approximately the midpoint thereof. The tubular journal may be formed from a short section of a cylindrical member that is attached to the tong by means of welding or the like. A pivot pin 22 is used to pivotally couple the tongs to the arm members of the main frame. The pivot pin may be secured in position by means of cotter keys 23 disposed at the opposite ends thereof.

The upper end of each of the tong members is provided with a second tubular journal 23 that may also be short sections of a cylindrical member attached to the tong members by welding or the like. The upper ends of the tong members are attached to an actuating mechanism which includes a pair of actuating links 23, each of which is secured to the upper end of one of the tong members by a pivot pin 25. The pair of actuating links are disposed on the outside of the tong members and on the inside of the vertical portions of the main frame. Pivot pins 25 may be retained in place by means of cotter keys or similar devices disposed at the end thereof.

The inner ends of the actuating links are joined together by means of a rod or main pivot pin 30 that passes through elongated slots 31 formed in the vertical portion of the main frame and through a lifting member 33. The lifting member 33 preferably has a square shape and is positioned between the inner ends of the actuating links, as shown in FIGURE 1. A lifting ring catch in the form of a ring 32 is secured to the upper end of the lifting member by means of welding or the like. The main pivot pin 30 passes through both of the vertical portions of the main frame members and the inner ends of the actuating links and the lifting member 33.

The lower end of each of the tong members is provided with a pivoted rectangular-shaped pad 40. Each pad 40 consists of an elongated, rectangular-shaped inner pad 41 formed of a material that will not damage the pipe member being lifted by the device. For example, when pipes are being lifted that have a highly finished outer surface, the pad members may be formed of a relatively soft material, as for example, canvas and the like. In contrast, if the pipe has a relatively rough outer surface, as for example, concrete pipe and the like, the pads 41 may be formed of steel or other metal. The pads 41 are fastened to the rectangular-shaped pad surface 42 of the individual pads. The pad surfaces 42 are provided with two spaced ears which extend vertically from the surface of the rectangular pad surface. The ears 43 should be spaced apart a distance sufficient to permit the tong members to be positioned between the two ears. The pad members are pivotally connected to the ends of the tong members by means of pivot pins 44 that may be secured in place by means of cotter pins or similar devices.

A latching means is provided for retaining the tongs in an open position until it is desired to lift a section of pipe. The latching means consists of a latch member 51 that is pivotally mounted at one end on the main frame by means of a pivot pin 52. The latch member 51 is provided with a notched section 53 formed in one edge thereof. The notched section 53 is positioned so that it may engage one end of the main pivot pin 30 when it is lowered to the bottom of the slot-shaped openings formed in the vertical portions of the main frame member. A tension spring 54 is provided to insure that the latch member moves in a direction to engage the main pivot pin as the main pivot pin is lowered in the slot-shaped openings in the main frame member.

Figure 3:
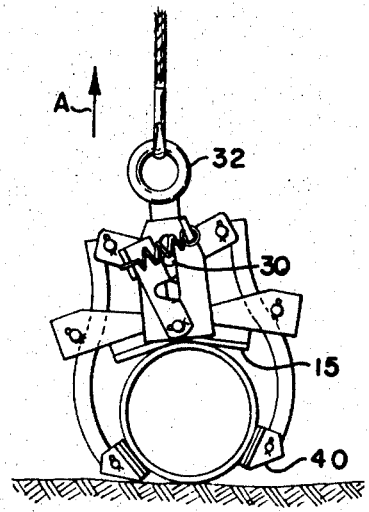
FIGURE 3 shows the device in operating position and lifting a section of pipe.

The operation of the device in lifting and lowering a section of pipe into an open ditch or trench is best shown in FIGURES 3–6. As shown in FIGURE 3, the device has been placed around a section of pipe and lifting ring 32 raised. Before it is possible to raise the device, it will, of course, be necessary for the operator to pull the latch mechanism 50 to the left, as shown in FIGURE 3, in order that the notch in the latch mechanism may release the main pivot pin. When the lifting ring 32 is raised, the main pivot pin 30 will travel upwardly in the slot formed in the main frame member and the latch may then be released. As the main pivot pin travels upwardly, it will cause the inner ends of the actuating links to rise. As the inner links of the actuating links rise, they will force the upper ends of the tong members outwardly and thereby pivot the lower ends of the tong members inwardly. The tong members will move inwardly until the pad members 40 engage the outer surface of the pipe, and the pad members 15 and 16 are engaged with the top of the pipe. Further raising of the lifting ring will lift the pipe from the surface of the ground and permit it to be moved to its desired location.

Figure 4:
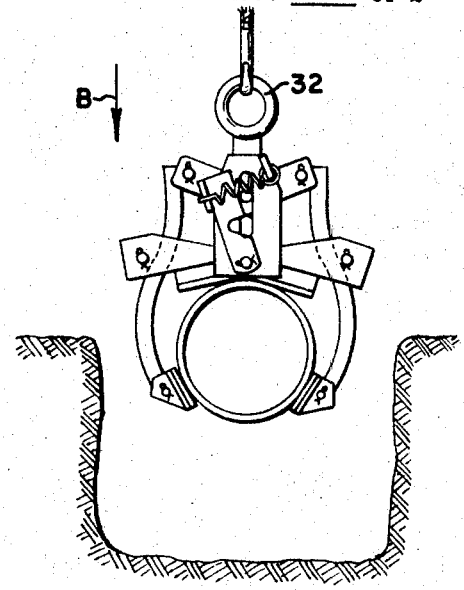
FIGURE 4 shows the device carrying a section of pipe to an open ditch.
Figure 5:
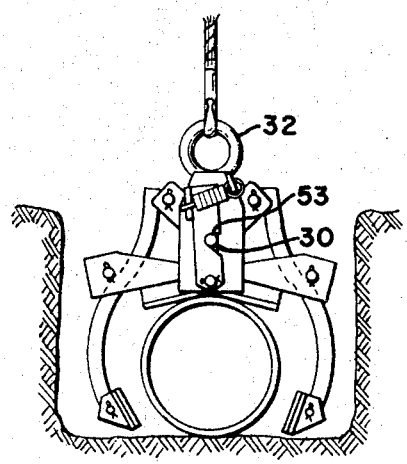
FIGURE 5 shows the device being opened to permit its removal from the pipe section after the pipe section is placed in the ditch.
Figure 6:
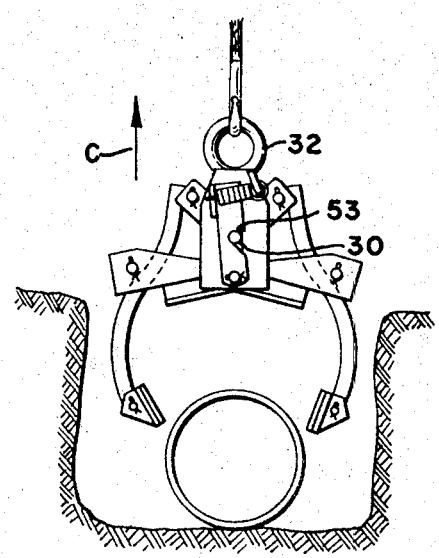
FIGURE 6 shows the device being removed from the ditch in order that the next section of pipe may be lifted.

As shown in FIGURE 4, the pipe section is being lowered into the open trench or ditch. As the pipe is lowered, its lower surface will come to rest in the bottom of the ditch and further lowering of the lifting ring will permit the main pivot pin to move downwardly in the slot formed in the main frame member. As the main pivot pin moves downwardly in the slot, it will lower the inner ends of the actuating links and cause the upper ends of the tong members to move inwardly. This will cause the lower ends of the tong members to move outwardly and release the pipe as shown in FIGURE 5. The lifting ring is lowered until the latch moves to the right to lock the main pivot pin in position, as shown in FIGURE 5. When the main pivot pin is locked in position, the lifting device will be retained in an open position and the device may be withdrawn from the trench. The device is withdrawn from the trench, as shown in FIGURE 6, with the tong members locked in an open position. The device is now ready to pick up the next section of pipe and lower it into the trench. As explained above, after the device is placed around a section of the pipe, the operator need only release the latch in order that the main pivot pin may move upward to cause the tong members to engage the outer surface of the pipe.

Figure 7:
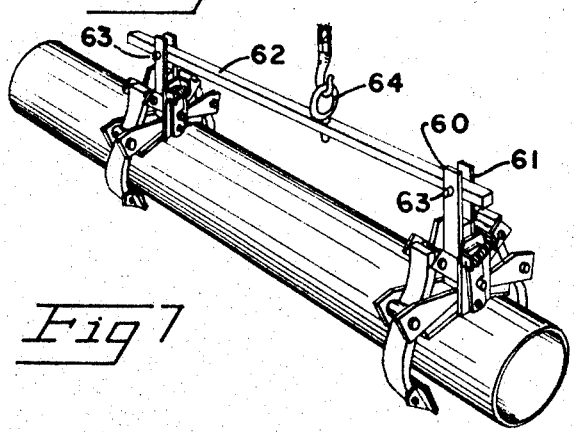
FIGURE 7 shows two of the devices utilized in a parallel arrangement to lift a long section of pipe.

When exceedingly long lengths of pipe are to be moved, two of the devices may be used in parallel, as shown in FIGURE 7. The devices shown in FIGURE 7 are modified in that the lifting rings of the device described above are removed and two lifting plates 60 and 61 substituted therefor. The two lifting plates are secured to the lifting member 33 of the device by means of welding or the like. The two lifting devices are coupled together by means of a lifting beam 62 whose ends are attached to the lifting members 60 and 61 by means of pins 63. The center of the lifting beam 62 is provided with a ring 64 in order that the lifting hook or similar device may be connected to the lifting beam in order that a section of pipe may be lifted.

The operation of the device shown in FIGURE 7 is exactly the same as that described above with reference to FIGURES 3–6. More particularly, the device is lowered about a section of the pipe and the latch members tripped to permit the device to be raised. As the device is raised, the upper ends of the tongs will be moved outwardly by means of the actuating links causing an inward movement of the lower ends of the tongs. As the lower ends of the tongs move inwardly they will engage the outer surface of the pipe and permit it to be lifted by the device. After the tong members engage the pipe, it may be lifted and moved to a desired position, as for example, an open trench where it may be lowered in position. After the pipe rests on the bottom of the trench, the device may be lowered, which will cause the tong members to open, thus releasing the pipe. After the tong members are opened the latch member 50 will engage the end of the main pivot pin and lock the tong members in an open position. The lifting device may then be withdrawn from the trench and used to move the next section of pipe into position.

What is claimed is:

1. A set of tongs for lifting an object comprising: a main frame member having a generally vertically extending portion; a pair of tong members each of which is pivotally secured intermediate its ends to said main frame member with each being on a side of said frame member opposite to that of the other; actuating mechanism secured to the upper ends of said tong members; and a lifting member secured to said actuating mechanism, said actuating mechanism causing an inward gripping pivotal motion of the lower portion of said tong members upon upward translation of said lifting member and an outward releasing pivotal motion of the lower portion of said tong members upon downward translation of said lifting member, said actuating mechanism including a pair of actuating links, one of which has a first end pivotally secured to one of said tong members adjacent the upper end thereof and the other of which has a first end pivotally secured to the other of said tong members adjacent the upper end thereof, the second ends of both of said links being pivotally secured to a pivot pin extending within a slot formed in the vertical portion of said main frame member for vertical movement therein by said lifting member.

2. The lifting tongs of claim 1 further including a latching means for selectively maintaining the lower portions of said pair of tong members in said outward releasing position.

3. The lifting tongs of claim 2 wherein said latching means is spring biased to engage a portion of said pivot pin when said pin is at the lower end of said slot, said latch means being selectively releasable against said bias to permit said pivot pin to be moved upwardly within said slot.

4. The lifting tongs of claim 1 further including a pair of pads for gripping the object to be lifted, each of said pads being pivotally mounted on the lower end of the respective one of said tong members.

5. The lifting tongs of claim 1 wherein said main frame member comprises a pair of laterally spaced frame plates, each of which has a vertically extending portion through which a slot is formed receiving said pivot pin, and an arm extends from each opposite side of said vertical portion of each of said frame members, the arms of one of said frame members being laterally aligned in spaced relation with the arms of the other and said tong members being disposed between said aligned spaced arms.

References Cited

UNITED STATES PATENTS

| | | | |
|---|---|---|---|
| 2,215,844 | 9/1940 | Van Syckle | 294—110 |
| 2,743,954 | 5/1956 | Ostlund | 294—110 |
| 2,745,695 | 5/1956 | Peyer | 294—110 |
| 2,911,251 | 11/1959 | Osborn | 294—110 |

ANDRES H. NIELSEN, *Primary Examiner.*